No. 759,952. PATENTED MAY 17, 1904.
C. A. ANDERSON.
CULTIVATOR.
APPLICATION FILED JULY 18, 1903.
NO MODEL.
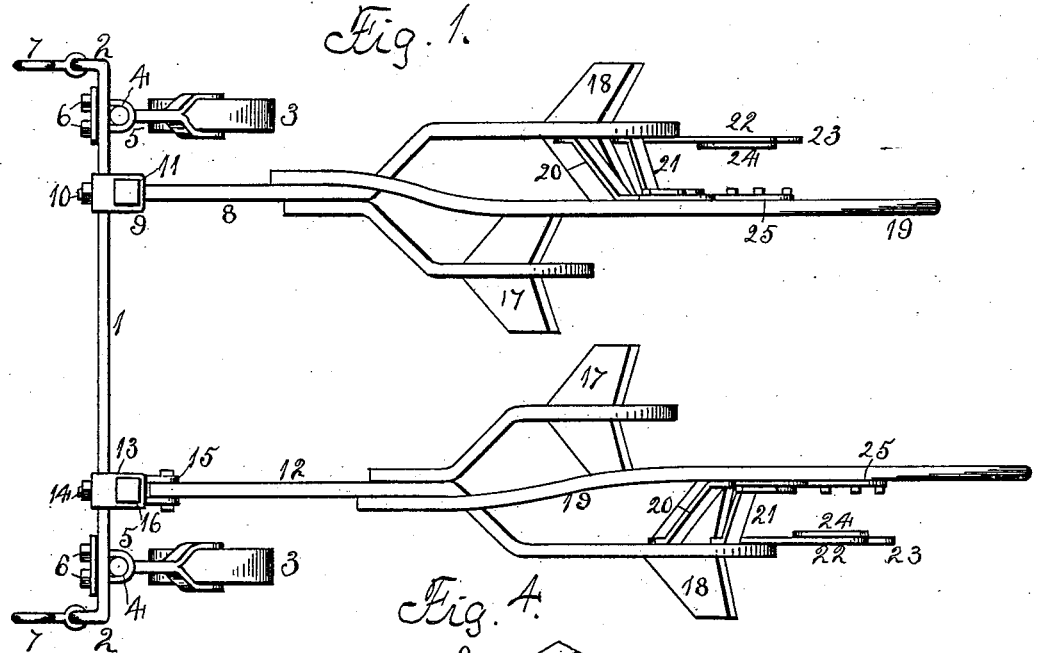
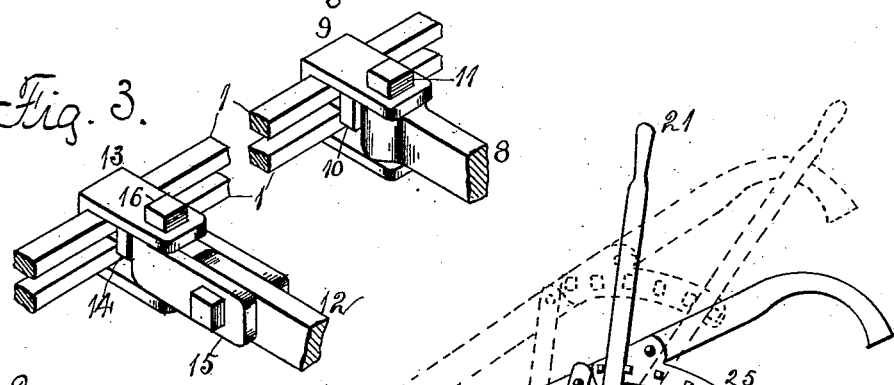
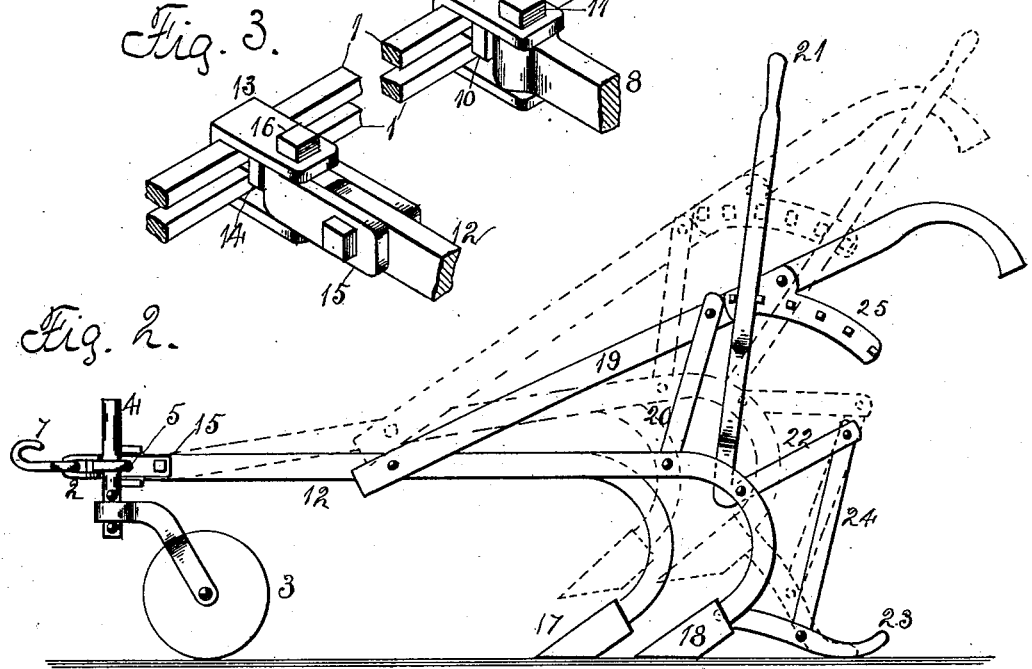
Witnesses:
Wm. E. Griggs
H. J. Slagle
Inventor:
Charles A. Anderson
By A. O. Behel
Attys.

No. 759,952. Patented May 17, 1904.

UNITED STATES PATENT OFFICE.

CHARLES A. ANDERSON, OF ROCKFORD, ILLINOIS.

CULTIVATOR.

SPECIFICATION forming part of Letters Patent No. 759,952, dated May 17, 1904.

Application filed July 18, 1903. Serial No. 166,202. (No model.)

*To all whom it may concern:*

Be it known that I, CHARLES A. ANDERSON, a citizen of the United States, residing at Rockford, in the county of Winnebago and State of Illinois, have invented certain new and useful Improvements in Cultivators, of which the following is a specification.

This invention relates to improvements in walking-cultivators in which one drag-bar has a connection with the axle, permitting it to have a horizontal swinging movement and a vertical movement independent of the axle, and the other drag-bar has only a horizontal swinging movement independent of the axle, and the axle supported upon carrying-wheels.

In the accompanying drawings, Figure 1 is a plan view of my improved cultivator. Fig. 2 is a side elevation. Fig. 3 shows the connection of the left-hand drag-bar with the axle. Fig. 4 shows the connection of the right-hand drag-bar with the axle.

The axle is formed of double bars 1, having their ends 2 turned forward. Caster-wheels 3 have their shank portion 4 connected with the axle by staple-formed bolts 5, surrounding them, passing between the bars of the axle, and receive nuts 6 on their screw-threaded ends, by means of which the axle can be adjusted vertically. The caster-wheels can be adjusted bodily in the lengthwise direction of the axle. To the forwardly-curved ends of the axle are connected the hooks 7, to which the team is connected.

The connection of the right-hand drag-bar 8 with the axle is shown at Fig. 4, consisting of the staple-formed bar 9, held in connection with the axle by the bolt 10. The free ends of this bar are perforated and receive the perforated forward end of the drag-bar and are held together by the bolt 11. This connection allows the drag-bar to have a movement in a horizontal plane independent of the axle by which the drag-bar is raised. The axle will be tipped forward on the caster-wheels.

The left-hand drag-bar 12 in its connection with the axle is shown at Fig. 3. Said connection consists of the staple-formed bar 13, held in connection with the axle by the bolt 14. The front end of the drag-bar 12 has an extension 15 pivoted thereto, and this extension has a vertical hole through which a bolt 16 passes, connecting it with the free ends of the plate 13.

The pivotal connection between this drag-bar and its forward extension permits the drag-bar to move in a vertical direction, and the pivotal connection between the extension and the axle allows the drag-bar to move in a horizontal direction. The movements of the left-hand drag-bar are independent of the movements of the right-hand drag-bar, the right-hand drag-bar serving to hold the axle in an upright position.

The connection between the forward ends of the drag-bars and the axle are adjustable in the lengthwise direction of the axle to cultivate rows of corn of different widths.

The left-hand drag-bar supports two shovels 17 and 18. A handle 19 has one end connected to the drag-bar, and a brace 20 forms a connection between the handle and drag-bar. To that portion of the drag-bar supporting the shovel 18 is pivoted a hand-lever 21, having a rearward extension 22. A shoe 23 has a pivotal connection with the drag-bar and extends rearward, and a link 24 connects this shoe with the extension 22 of the hand-lever.

A bracket 25, with projections, is secured to the handle 19, and the hand-lever is capable of being moved into engagement with the projections.

By moving the hand-lever rearward the drag-bar will be raised into the position shown in dotted lines, Fig. 2, and held by the projections of the bracket, thereby holding the shovels free of the ground for transportation, and by adjusting the hand-lever into other spaces of the bracket the shovels can be held at other elevations for cultivating at various depths.

The construction of the right-hand drag-bar and its hand and lifting lever connection are the same as the left-hand drag-bar, and like reference-numerals are employed for both.

I claim as my invention—

1. In a cultivator, the combination of an axle, wheel-supports for the axle, and two drag-bars having a connection with the axle, one capable of a horizontal and vertical movement independent of the axle and the other capable of only a horizontal movement independent of the axle.

2. In a cultivator, the combination of an axle, wheel-supports for the axle capable of bodily adjustment in the lengthwise direction of the axle, and two drag-bars having a connection with the axle and capable of bodily adjustment in the lengthwise direction of the axle, the adjustment of the wheels and drag-bars being independent of each other.

3. In a cultivator, the combination of a drag-bar, a support for the forward end of the drag-bar, a shoe having a pivotal connection with the shovel-standard near the shovel, and a hand-lever having a pivotal connection with the drag-bar and a link connection with the shoe.

4. In a cultivator, the combination of a drag-bar, a support for the forward end of the drag-bar, a shoe having a pivotal connection with the shovel-standard near the shovel, a hand-lever having a pivotal connection with the drag-bar, and a link connection with the shoe, a handle connected to the drag-bar, and a rack-bar supported by the handle with which the hand-lever engages.

CHARLES A. ANDERSON.

Witnesses:
   A. O. BEHEL,
   E. BEHEL.